April 21, 1970     L. M. ROSS ET AL     3,508,254

ACCELEROMETER SYSTEM

Filed April 26, 1967

Lester M. Ross
Brooks H. Grimme,
INVENTORS.

BY Harry M. Saragovitz
Edward J. Kelly
Herbert Berl
Aubrey J. Dunn

United States Patent Office 3,508,254
Patented Apr. 21, 1970

3,508,254
ACCELEROMETER SYSTEM
Lester M. Ross, Huntsville, Ala., and Brooks H. Grimme, Orlando, Fla., assignors to the United States of America as represented by the Secretary of the Army
Filed Apr. 26, 1967, Ser. No. 634,810
Int. Cl. H03k 13/17
U.S. Cl. 340—347
2 Claims

ABSTRACT OF THE DISCLOSURE

A rebalancing system for an analog accelerometer. The system converts the analog output signal of the accelerometer to a digital output signal for use by a computer. The digital output signal is also used to rebalance the accelerometer.

BACKGROUND OF THE INVENTION

This invention is in the field of inertial accelerometers. Such accelerometers find uses, for example, in guided missile systems. Missile systems require extremely accurate measurements of acceleration, which measurements have been accomplished in the past with expensive analog accelerometers and expensive analog computers. It has long been known that if digital acceleration signals could be generated, then computer costs and errors could be greatly reduced.

The most desirable means of generating digital acceleration signals is to use an inherently digital device; however, there is no pure digital accelerometer with sufficient accuracy, at present. The next best means is something to convert the output of an analog accelerometer to a digital signal. This has not been successful in the past, because it has not been possible to produce digital pulses of sufficient accuracy. Even if the required accuracy could be achieved, the expense of the precision pulse circuits would be prohibitive.

The present invention solves the above problems.

SUMMARY OF THE INVENTION

The present invention is an electronic pulse rebalancing system that can be used with a cheap, nonlinear analog accelerometer to enable the analog accelerometer to make a highly accurate measurement of acceleration with a linear digital output. This invention has means to cause the acceleration rebalance forces inside an accelerometer to occur at a constant level, but alternating between positive and negative directions; switching to the positive direction at a fixed cyclic rate determined by the logic of a clock and two flip-flop circuits, and switching to the negative direction at a time determined by the logic of the clock and flip-flops, plus a level detector. This configuration eliminates the two most difficult sources of nonlinearity in pulse rebalance circuits. First, the current passing through the accelerometer's torque motor is at a constant level, except for a short switching time, and changes only in direction regardless of the applied acceleration level. This means that the heating of the unit is constant at all accelerations levels, thus eliminating nonlinearities resulting from temperature changes in the unit. Second, the same number of rises and falls occur in the torque motor current waveform regardless of acceleration levels. This means that a difference in the shape of the positive pulse versus the negative pulse appears as a direct current bias which can be easily compensated.

An object of this invention is to provide a system for converting an analog accelerometer signal to a digital signal.

Another object is to provide an analog accelerometer having an improved accuracy when operated with a digital output signal.

A further object is to provide an improved analog accelerometer system wherein the total cost of the accelerometer computer package is less than that of prior art systems.

Other objects and advantages of this invention will be apparent from the following description, and from the accompanying drawings.

DESCRIPTION OF THE PREFERRED EMBODIMENT

Figure 1:
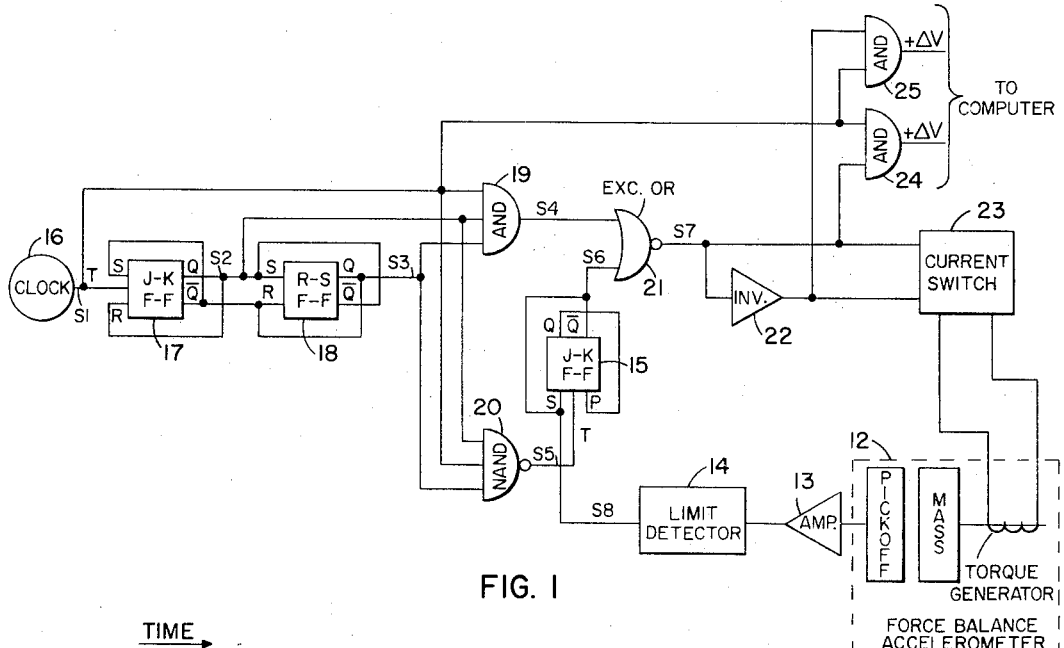
FIGURE 1 is a schematic diagram of the inventive system.

Referring now to FIGURE 1, reference numeral 12 designates a conventional analog force-balance accelerometer for sensing acceleration in a well-known manner. This accelerometer includes a mass sensitive to acceleration, a pick-off transducer responsive to movement of the mass, and a torque generator for rebalancing the accelerometer, by returning the mass to its null position. This accelerometer provides a positive or a negative D-C voltage, depending on the direction of acceleration. The output of accelerometer 12 is connected through amplifier 13 to limit detector 14, the output of which is applied to the Set input of J–K Flip-Flop 15. Limit detector 14 converts the varying D-C signal from accelerometer 12 to a constant level D-C signal, which is positive when the signal from amplifier 13 is positive, and zero when the signal from the amplifier is negative. Detector 14 may take the form of a Schmitt trigger. A clock 16 generates a series of positive and negative pulses at a constant rate. These pulses are connected to the T (Trigger or Toggle) input of J–K Flip-Flop 17, to one input of an AND gate 19, to one input of each of AND gates 24 and 25, and to one input of NAND gate 20. The Q (1) output of J–K Flip-Flop 17 is connected to the R (reset) input of 17, to the S (set) input of R–S Flip-Flop 18, to one of the inputs of AND gate 19, and to one of the inputs of NAND gate 20. The $\bar{Q}$ (0) of J–K Flip-Flop 17 is connected to the S input of 17 and to the R input of R–S Flip-Flop 18. The Q output of R–S Flip-Flop 18 is connected to the R input of 18, to one input of NAND gate 20, and to one input of AND gate 19. The $\bar{Q}$ output of R–S Flip-Flop 18 is connected to the S input of 18. The output of AND gate 19 is connected to one input of an Exclusive OR gate 21. The output of NAND gate 20 is connected to the T input of J–K Flip-Flop 15. The Q output of J–K Flip-Flop 15 is connected to the R input of 15 and the $\bar{Q}$ output is connected to the S input of 15 and also to one input of Exclusive OR gate 21. The output of Exclusive OR gate 21 is connected to one input of a current switch 23 to the input of an inverter 22, and to one input of AND gate 24. The output of inverter 22 is connected to one input of current switch 23 and to one input of AND gate 25. The output of current switch 23 is connected to the torque coil of accelerometer 12. Current switch 23 may take the form of a power flip-flop, or the like.

Figure 2:
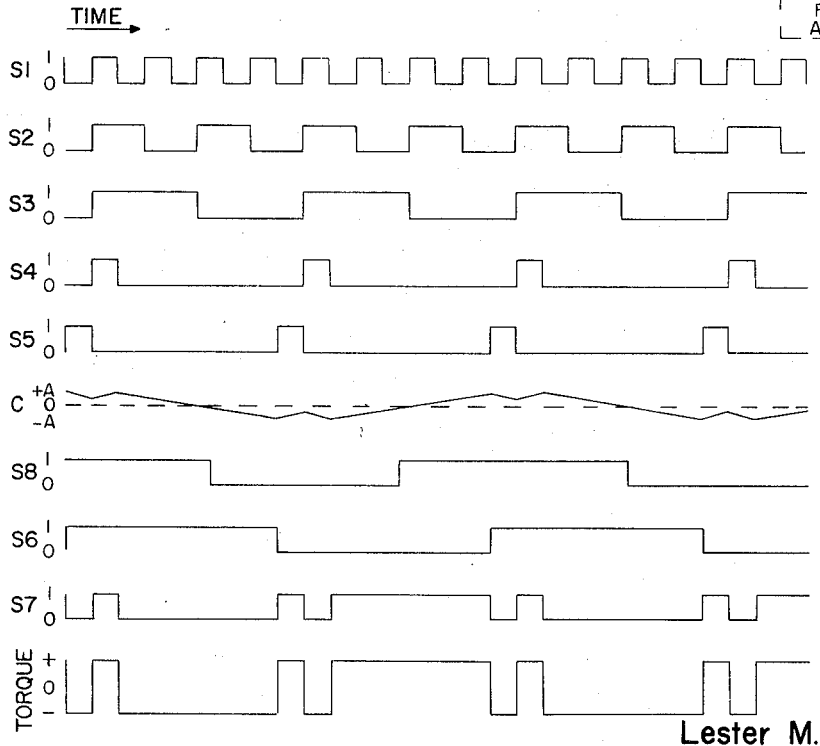
FIGURE 2 shows typical waveforms of the FIGURE 1 system, for an exemplary acceleration.

In the FIGURE 1 circuit, when force-balance accelerometer 12 is subjected to a positive acceleration, the mass therein is forced to move off-null and its motion is indicated by a positive output from the pickoff. This positive pickoff signal is amplified by amplifier 13. Reference may be made to FIGURE 2 for the waveforms at various points in the FIGURE 1 circuit. Waveform C of this figure is an exemplary acceleration applied to the accelerometer, and the remainder of the waveforms show time-variable conditions of various portions of the FIGURE 1 circuit. The output of amplifier 13 is fed to limit detector 14. Limit detector 14 converts the varying D-C signal to a constant level D-C signal which is positive when the signal from amplifier 13 is positive, and zero when the signal is negative. The output signal (S8) from the limit detector goes to the S input of J-K Flip-Flop 15. This flip-flop can change only during the time that the T input is changing from an inactive state to an active state, that is, on the positive slope of a pulse from NAND gate 20. The effect of this arrangement is to cause the state of signal S6 to periodically match the state of signal S8, at toggle times determined by signal S5, and to hold the state of S6 constant between toggle times. After the next toggle time, (or possibly instantaneously) the output signal S6 will be active. One-half the clock period later, S4 changes from inactive to active and remains active for one-half a clock period. During this interval, since both inputs of Exclusive OR gate 21 are active, the output is active (the Exclusive OR gate has the characteristic that if both inputs are at the same state, the output is active). When the output of Exclusive OR 21 is active, the current switch 23 produces current through the torque generator in the direction to force the mass and pickoff further off-null, or in the same direction as positive applied acceleration. At the same time, AND gate 24 is opened to pass the clock signal indicating negative acceleration. At the end of the half-clock period just described, S4 returns to an inactive state, and since S6 is still active, S7 goes inactive. When S7 goes inactive, the current through the torque generator from the current switch is reversed, and the mass is moved toward null by the resulting reversal of torque. At the same time, AND gate 25 is opened to pass clock pulses indicating positive acceleration being sensed. It is possible that before the mass is nulled, another half-period will occur when S4 is active. If so, for that half-period, the mass will again be moved a small amount in the direction away from the null. It is also possible that the mass will move through the null (overshoot). If it does, proper correcting current will be supplied at the next toggle time. Even in the absence of acceleration, the mass will not remain at a null position, but will "dither" about null.

The outputs of AND gates 24 and 25 may be used by a digital computer, and could control an up-down counter in the computer, with the count of the counter being directly related to the acceleration sensed.

It can thus be seen that the invention fulfills its objectives. An ordinary accelerometer is employed, with the analog output signal of the accelerometer converted to a digital output signal, and with the digital output signal causing rebalance of the accelerometer.

For accelerations other than those shown, corresponding signals will be generated.

While a specific embodiment of the invention has been shown and described, other embodiments may be obvious to one skilled in the art, in light of this disclosure.

What is claimed is:

1. An accelerometer system including: an analog accelerometer for providing analog outputs, and including rebalancing means; logical circuit means connected to said accelerometer for converting said analog outputs to digital outputs and including clock means providing digital pulses, and means for changing the outputs of said accelerometer to binary outputs; logic means having inputs connected to said clock means and to said accelerometer and having an output connected to said control means; wherein said logic means additionally includes first, second, and third bistable means, each having inputs and outputs; first, second, and third AND gates, each having inputs and an output; a NAND gate having inputs and an output; an Exclusive OR gate having inputs and an output; said means for changing including a limit detector having an input and an output; said clock connected to first respective inputs of each of said first bistable means, said first, second, and third AND gates, and to said NAND gate; a first output of said first bistable means connected to a second input of said first bistable means, to a first input of said second bistable means, to a second input of said first AND gate, and to a second input of said NAND gate; a second output of said first bistable means connected to a third input of said first bistable means, and to a second input of said second bistable means; a first output of said second bistable means connected to said second input of said second bistable means, to a third input of said AND gate, and to a third input of said NAND gate; said output of said first AND gate connected to a first input of said Exclusive OR gate; said output of said NAND gate connected to a first input of said third bistable means, a first of said outputs of said third bistable means connected to a second input of said Exclusive OR gate, and to a second input of said third bistable means, a second output of said third bistable means connected to a third input of said bistable means; said output of said accelerometer connected to said input of said means for changing; said output of said means for changing connected to said second input of said third bistable means; inverter means having an input and an output; said control means having inputs and outputs; said output of said Exclusive OR gate connected to a first input of said control means, to a second input of said third AND gate; and to said input of said inverter means; said output of said converter means connected to a second input of said second AND gate and to a second input of said control means; and said outputs of said control means connected to said rebalancing means.

2. The system as defined in claim 1 wherein first bistable means is a first J-K flip-flop, with the toggle input of said flip-flop being said first input, the reset input being said second input, and with the set input being said third input; and with the Q output of said flip-flop being said first output of said first bistable means, the $\overline{Q}$ output of said first flip-flop being said second output of said first bistable means; said second bistable means being an R-S flip-flop, with the set input being said first input of said second bistable means, the reset input of said R-S flip-flop being said second input, the Q output being said first output, and the $\overline{Q}$ output being said second output of said second bistable means; said third bistable means being a second J-K flip-flop, with the toggle input thereof being said first input, the set input being said second input, the reset input being said third input, the $\overline{Q}$ output of said second J-K flip-flop being said first output of said third bistable means, and with the Q output being said second output of said bistable means.

References Cited

UNITED STATES PATENTS 2,918,574  12/1959  Gimpel et al. _____ 340—347 X
2,940,306  6/1960  Lozier _____ 340—347 X
3,042,911  7/1962  Paradise et al. _____ 340—347

DARYL W. COOK, Primary Examiner

G. R. EDWARDS, Assistant Examiner

U.S. Cl. X.R.

73—71.2